Patented June 9, 1936

2,043,705

UNITED STATES PATENT OFFICE 2,043,705

METHOD OF REMOVING FLUORINE FROM POTABLE WATERS

Gotthold Harry Meinzer, Glendale, Calif.

No Drawing. Application November 28, 1933, Serial No. 700,084

1 Claim. (Cl. 210—23)

The object of my invention is to provide a cheap and expeditious method for the removal of toxic traces of fluorine and/or its compounds from waters otherwise adapted for human consumption.

Recent medical research has established the fact that fluorides in drinking water are the cause of a serious tooth defect in children, known as "mottled enamel". This defect is characterized by an incomplete development of the enamel structure of the permanent teeth, with the result that they are discolored, pitted, structurally weak and unable to hold fillings. Fluorides apparently react on the human system to disturb the normal calcium metabolism and hence may have other injurious effects. Since mottled enamel has been reported from many communities in the United States and other countries, the problem of eliminating fluorides from public water supplies is a matter of considerable importance.

A fluorine concentration as low as two parts per million is considered toxic, hence the usual method of chemical separation by precipitation and filtration is impractical for a number of reasons: (a) a large excess of the precipitating reagent is required and remains in the water; (b) due to the low initial concentration of the fluorine ion, the resulting precipitate is colloidal in character, hence its separation from the water by ordinary methods of filtration or sedimentation is extremely difficult and commercially impractical.

I have found by experiment that fluorides can be completely separated and removed from waters or other solutions by means of certain insoluble surface-active substances having the specific property of adsorbing fluorine ions and compounds. A number of substances, both crystalline and amorphous, have to a greater or less degree the property of adsorbing fluorine ions from aqueous solutions. For example, the crystalline minerals fluorite and calcite were found to adsorb fluorides, and the mineral bauxite was found to be a very effective adsorbing agent.

The adsorptive properties of the hydroxides or the iron-aluminum group and the alkaline-earth group of metals were intensively investigated and it was found that all the hydroxides of the above metals were to some extent effective in removing fluorides from waters. However, from the standpoint of reagent efficiency, cost, and general practicability, aluminum hydroxide was found to be the most workable reagent. Following is a comparative test made on a water containing four parts per million of fluorine, using equal weights of reagent, equal volumes of water treated, and equal time of treatment:

Volume of water sample treated—150 cc.
Reagent per sample—0.01 gram.
Treating time—10 min.
Initial—Hydrogen ion concentration—6.0.

| Reagent | Fluorine (P. P. M.) | | Per cent of total fluorine removed |
|---|---|---|---|
| | Before treating | After treating | |
| Aluminum hydroxide | 4.0 | 0.25 | 94 |
| Iron hydroxide | 4.0 | 2.76 | 31 |
| Zinc hydroxide | 4.0 | 3.18 | 20 |
| Calcium hydroxide | 4.0 | 3.22 | 20 |
| Manganese hydroxide | 4.0 | 3.64 | 9 |

In treating water supplies on a large scale it is feasible either to form the adsorbing agent in the water or to utilize an agent already formed, and in the latter case the agent may be formed artificially or it may be found in nature. Again, the reagent may be applied by intermixture with agitation and removed by settling or filtration or, if of suitable physical character, it may be formed into a bed or pack through which the water may be percolated. Without going into all of the possible combinations of operating method, it will be sufficient to describe a treatment with artificially prepared aluminum hydroxide and a treatment with naturally occurring bauxite.

Aluminum hydroxide is cheaply prepared by the addition of a basic substance to an aqueous solution of alum or preferably of aluminum sulphate. The solution of the acid body may be fed into a flow stream of the water in measured proportions, and in many cases the alkaline salts normally contained in the water will be sufficient for the precipitation of the hydroxide. If the alkalinity be deficient for this purpose, it may be made up by the addition of relatively dilute solutions of sodium hydroxide or sodium carbonate.

The precipitate so formed is flocculent and bulky and is correspondingly readily separated. The treated water may be run into settling basins for sedimentation, or it may be passed through a sand filter or any other means for removing sediments of this nature. The water so treated will be found to be substantially or entirely free from fluorine if the precautions later described are observed.

If the water be deficient in alkalinity, so that the addition of alkali for the precipitation of the hydroxide is required, the treatment may be somewhat simplified by precipitating the hydroxide from stronger solutions of the same materials and feeding the precipitate, in the form of a paste or pulp, into the water to be treated. I have found that the occurrence of the precipitation in the water itself is not essential to the removal of the fluorine, but that the hydroxide previously precipitated has the same quantitative effect.

The mineral bauxite, a hydrated oxide of aluminum, is also an effective fluorine removing agent, but is not adapted to the treatment of water by intermixture as, even with the finest grinding, insufficient surface for effective adsorption is exposed. I therefore reduce this mineral to grains which I form into a filter pack or bed through which the water is passed, the removal of the fluorine and the separation of the reagent from the water being thus simultaneously accomplished. As only the surface of the grains is active contact surface, the consumption of reagent is much larger than in the method of treatment with a flocculent precipitate, but the simpler manipulation makes the bauxite treatment available for the treatment of relatively small water supplies, or it may be used for large quantity treatment where available at low cost and in the immediate neighborhood.

An extremely effective reagent for use in the same manner, that is, by percolation, may be produced by forming a filter bed of sand, coarsely powdered diatomaceous earth or other inert granular material, saturating this bed with aluminum sulphate solution, and thereafter passing through the bed sufficient alkali to precipitate the hydroxide. The precipitate is thus formed on the surfaces of the grains in very thin layers which offer the maximum surface exposure to the water to be treated. Proceeding in this manner I have obtained, by actual test, a reagent-fluorine ratio of 5:1, that is to say, five parts per million of solid aluminum hydroxide removed one part per million of fluorine from the water.

It should be observed that to obtain the maximum reagent efficiency the hydrogen ion concentration of the water to be treated should not exceed pH=8, on the alkaline side. Although the optimum pH varies somewhat with the composition of the water, it is usually between pH=7 and pH=5. I have found samples of fluoride waters which could not be successfully treated above a pH=8, but the alkalinity of such waters may be reduced by the careful addition of any suitable acid, such as extremely dilute sulfuric acid, and treatment was invariably successful within the pH range above set forth. The specifications for hydrogen ion concentration apply both to the treatment with flocculent aluminum hydroxide and to the treatment with bauxite.

Attention should be directed to the fact that the main function of the aluminum hydroxide in this treatment is to effect the ultimate removal of the fluorides from the water. Other reagents are known which will react with fluorine ions to form nominally insoluble fluorides, but in the minute traces in which fluorine is toxic, these fluorides are liable to remain in solution, while if actually precipitated such traces are nonfilterable. Apparently the aluminum precipitate acts to adsorb the fluorides, but whether or not this is the case, it firmly lays hold on and retains them in some manner and, because of its superior bulk and its relatively complete insolubility, is itself readily removed from the treated water.

The aluminum salt is further advantageous because of its extremely low cost and of the fact that soluble aluminum compounds are not objectionable in drinking water and do not add to its hardness.

In the attached claim, I use the expression "hydrated aluminum oxide" to cover both the precipitated dihydroxide and the mineral bauxite, the formula for each of these compounds being customarily written $Al_2O_3.2H_2O$ and the bodies performing the same fluorine-removing function as above described.

I claim as my invention:

The method of removing fluorine from otherwise potable water which comprises: intimately contacting water containing fluorine compounds with hydrated oxide of aluminum in quantity not less than five times the amount of fluorine present, in addition to any quantity of said oxide required to precipitate any colloids and suspended matter, whereby said fluorine compounds are caused to be entrained by said oxide, and separating said oxide together with said fluorine compounds from said water.

GOTTHOLD HARRY MEINZER.